Patented Aug. 27, 1940

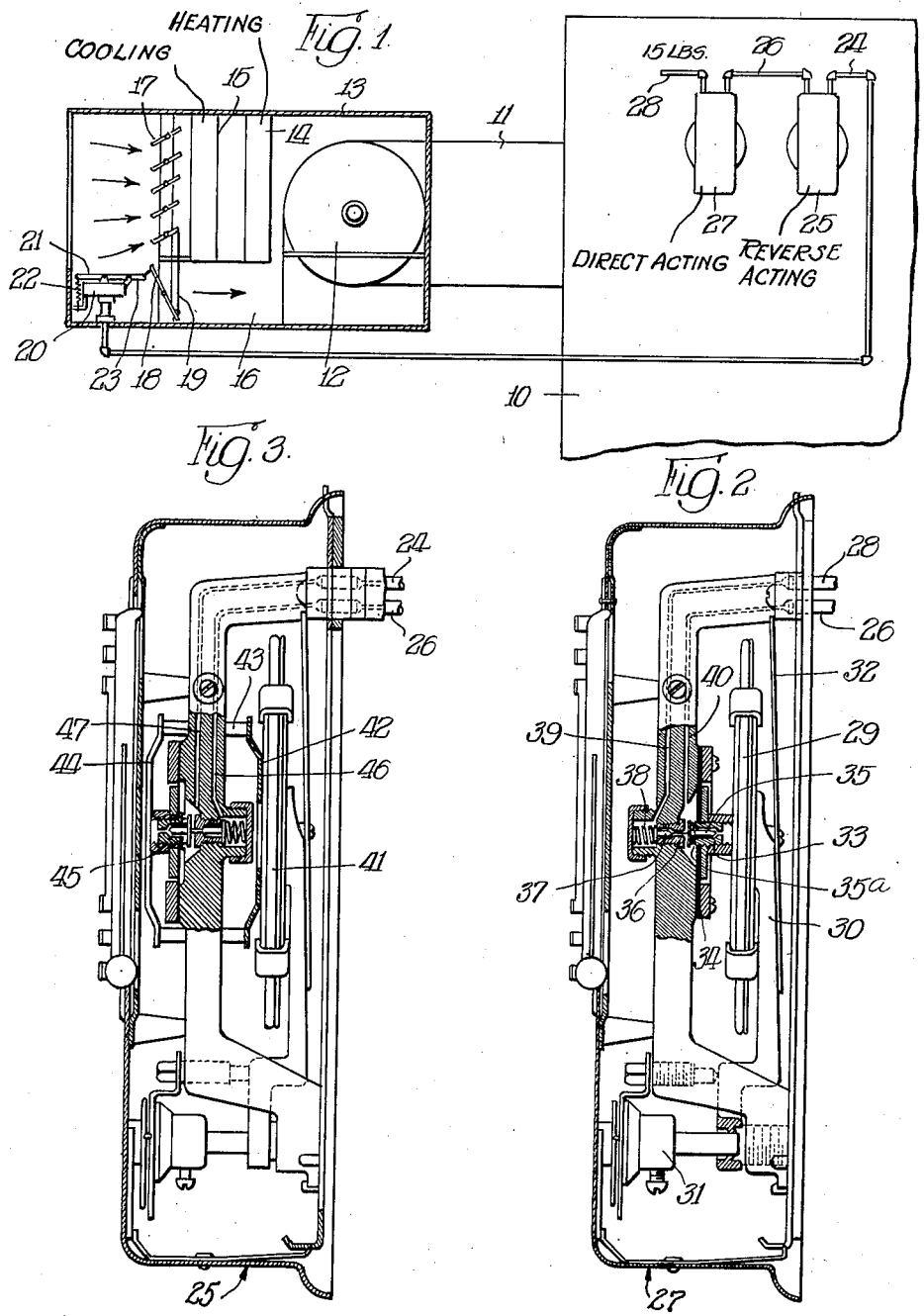

2,213,082

UNITED STATES PATENT OFFICE 2,213,082

AIR CONDITIONING APPARATUS

Irving Hamilton Dale, Melrose, Mass., assignor to The Powers Regulator Company, Chicago, Ill., a corporation of Illinois Application December 4, 1939, Serial No. 307,422

5 Claims. (Cl. 257—3)

My invention relates to apparatus adapted for use in controlling temperatures, both in cold and hot weather.

An ideal arrangement involves the use of apparatus that will, without action on the part of an operator, take over the control of temperatures, either in winter or summer, and which will enable the use of the same circulating and heat transfer apparatus and the same thermostatic control means, all operating without requiring attention from an operator.

The invention will be more readily understood by reference to the accompanying drawing, in which, Fig. 1 is a diagrammatic view illustrating a control system such as contemplated;

Fig. 2 is a sectional view through a direct acting gradual acting thermostat, such as contemplated; and, Fig. 3 is a similar view through a reverse acting-gradual acting thermostat for use in series with the direct acting thermostat.

In the trade the term "direct acting" comprehends a thermostat so arranged that it will pass air to a control device on an increase in temperature and a "reverse acting" thermostat is one that will progressively reduce the supply of air to such a device on an increase in temperature.

For the purpose of diagrammatic illustration I have indicated in Fig. 1 a room or space 10, the temperature of which is to be controlled. A duct 11 provides for the passage of air to the space from a fan 12 located within a casing 13. Within the casing are heating coils 14 and cooling coils 15. The casing provides a passage 16 separate from the passage over the heat transfer coils. A louvre damper 17 controls the entrance of air to the space within which the heat transfer coils are located, and a damper 18 controls the entrance of air to the passage 16. The two dampers 17—18 are connected by a link 19 in such manner that as one damper is opened the other is closed. A damper motor is indicated at 20, the motor being of a common type and so arranged that as air pressure is exerted thereon the arm 21 will be raised against the force of the spring 22, thus lowering the overhung end 23 of the arm 21. This will open the damper 18 and close the damper 17. An air pipe 24 communicates with the motor 20, this constituting the return line for a reverse acting thermostat 25, shown in detail in Fig. 3. The air supply to the thermostat 25 is through a pipe 26, which constitutes the return line for the direct acting thermostat 27, shown in detail in Fig. 2. A pipe 28 supplies air to the thermostat 27 at a constant pressure of fifteen pounds per square inch.

The direct acting thermostat, shown in Fig. 2, is of a well-known form and comprises an expansible thermostatic disc 29 mounted on a support 30 having adjusting means 31 applied thereto and backed by a spring 32. An assembly 33 is mounted on a flexible diaphragm 34 and provides a seat for a valve 35. This valve member is connected by a thrust engagement to a second valve 37 which is resisted by a spring 38, the valve being within a second assembly 36.

The supply pipe 28 communicates with a passage 39 open to the space in the rear of the valve 37 while the pipe 26—that is, the return pipe— communicates with a passage 40 in communication with the space behind the diaphragm 34.

The operation is as follows, assuming that there is a supply of air in the pipe 28: At a temperature less than that for which the thermostat is set, the disc 29 will be contracted, the supply valve 37 will be closed by its spring 38 and the exhaust valve 35 will be open by reason of its springs 35a. As the temperature within the space increases, the disc will expand, first closing the exhaust valve 35 and then, through contact between the valve 35 and the stem of the valve 37, tend to open the valve 37 admitting air into the return pipe 26.

In this case the return pipe 26 constitutes the supply pipe for the reverse acting thermostat 25 which is illustrated in detail in Fig. 3. In this instrument the expansible disc 41 is connected through a plate 42 and legs 43 to a bar 44 which bears against a valve assembly 45 and other parts that are identical with those heretofore described in connection with Fig. 2.

In the construction of Fig. 3 any air admitted through the pipe 26 is directed through passage 46 thence past the inlet valve to the passage 47, thence through pipe 24 to the damper motor 20. It will be seen that at any temperature below that for which the instrument is set, air will freely pass through the instrument. However, upon an increase of temperature over that for which the instrument is set, the inlet valve will gradually close, shutting off the supply of air that is delivered to the damper motor and when the supply is entirely shut off, continued movement will permit the exhaust of air through the exhaust valve.

Assuming that the direct acting thermostat 27 is set for 70° and the reverse acting thermostat is set for 80°, and further that a supply pressure of fifteen pounds per square inch is provided for the incoming air, the schedule of pressures at different temperatures is shown in the following table:

| Temperature, degrees | Pressure in line 26 | Pressure in line 24 |
| --- | --- | --- |
| | Pounds | Pounds |
| 66 | 0 | 0 |
| 67 | 1 | 1 |
| 68 | 3 | 3 |
| 69 | 5 | 5 |
| 70 | 7 | 7 |
| 71 | 9 | 9 |
| 72 | 11 | 11 |
| 73 | 13 | 13 |
| 74 | 15 | 15 |
| 75 | 15 | 15 |
| 76 | 15 | 15 |
| 77 | 15 | 15 |
| 78 | 15 | 13 |
| 79 | 15 | 11 |
| 80 | 15 | 9 |
| 81 | 15 | 7 |
| 82 | 15 | 5 |
| 83 | 15 | 3 |
| 84 | 15 | 1 |
| 85 | 15 | 0 |

Since the damper motor 20 will be so arranged that a pressure of seven pounds per square inch will serve to close the damper 17, and open the damper 18, it will be seen that, according to the schedule, the air supply to the space being controlled will be caused to by-pass the heat exchange elements and be delivered through the passage 16 when the temperature reaches 70°; further that as the temperature rises and pressure increases, this condition will prevail up to a temperature of 78°, when the pressure in the line 24 will begin to be progressively reduced and at a temperature of 85° there will be no pressure in the line 24 and consequently the damper 17 will be entirely open and the damper 18 entirely closed. This will cause air to circulate over the cooling coils to which a refrigerant will be supplied. The reversal of position of the dampers will, of course, take place gradually from a temperature of 81° upward.

It is assumed that in the interval of temperature rise from 70 to 80, suitable means will be provided, either automatically or manually for interrupting the supply of heat to the heating coils and supplying a quantity of a cooling medium to the cooling coils. Means for accomplishing this purpose are indicated in a copending application, but since such means are unimportant in the broad expression of the invention intended to be covered hereby, I have not illustrated it.

While I have described the system in connection with a damper arrangement in which there are oppositely positioned dampers, it will be understood that the damper motor may, with equal facility, be connected merely to a single damper acting as a means for volume control. In other words, in the suggested construction, the amount of air circulated would be reduced as the damper is closed and consequently the amount of heat transfer would be proportionately reduced. In the illustrated construction, the volume of air in circulation would remain constant, the amount in contact with the heat exchange element being varied according to temperature conditions.

An important advantage in connection with the system here disclosed is in that there is no constant waste of air. No air is lost except that which is exhausted in order to permit the return of the operating motor to idle position.

The foregoing system is particularly intended for use in enclosed spaces where human comfort is the sole consideration, it being assumed that temperatures between 70 and 80 are not entirely uncomfortable. Of course, the setting of the reverse acting thermostat at 80° is taken merely as an example and may be varied by manual adjustment as desired. If it is desired to maintain a fixed temperature either for commercial operations or for living conditions, the system disclosed in my copending application, Serial No. 309,423 may be used.

I claim:

1. In combination, means providing heat exchange elements for alternate heating and cooling, means for causing air to pass over said heat exchange elements, damper means for causing the volume of air delivery from said heat exchange elements to vary according to temperature, a damper motor and a conduit for delivering air to said motor, a thermostat arranged to deliver air under pressure to said conduit on an increase in temperature, and means in series with said thermostat and between it and said motor, arranged to progressively reduce the pressure of air effective on said damper motor after a predetermined temperature has been reached and a predetermined pressure of air is delivered by said thermostat.

2. In combination, means providing heat exchange elements for alternate heating and cooling, means for causing air to pass over said heat exchange elements, damper means for causing the volume of air delivered from said heat exchange elements to vary according to temperature, a damper motor and a conduit for delivering air to said motor, a thermostat arranged to deliver air under pressure to said conduit on an increase in temperature, and a second thermostat in series with said first thermostat arranged to reduce the pressure of air delivered to said conduit after a predetermined temperature has been reached.

3. In combination, means providing heat exchange elements for alternate heating and cooling, means for causing air to pass over said heat exchange elements, damper means effective to cause recirculation of air without contact with said heat exchange elements, a damper motor arranged to operate under air pressure to move said damper means whereby to effect said recirculation without contact with heat exchange elements, an air line to said damper motor, and direct-acting and reverse acting thermostats in series in said air line, each thermostat being subject to the temperature of the space whose temperature is to be controlled, the direct acting thermostat being set for a temperature below which heat is to be added, and the reverse acting thermostat being set for a temperature above which heat is to be withdrawn.

4. In combination, means providing heat exchange elements for alternate heating and cooling, means for causing air to pass over said heat exchange elements, damper means for by-passing air that would otherwise pass over said heat exchange elements, a damper motor arranged to move said damper to a position to by-pass said air upon an increase of air pressure effective thereon following an increase in temperature in the space in which the temperature is being controlled, a conduit for delivering air to said motor, a thermostat in said conduit arranged to deliver air to said conduit at an increased pressure following an increase in temperature, and a second thermostat also in said conduit arranged to reduce the pressure of air supplied to said motor after a predetermined temperature has been reached.

5. In combination, means providing heat exchange elements for alternate heating and cooling, means for causing air to pass over said heat exchange elements, damper means for causing the volume of air delivered from said exchange elements to vary according to temperatures, a damper motor and a conduit for delivering air to said motor, direct acting and reverse acting thermostats in series in said conduit, said direct acting thermostat being set for a temperature below which heat is to be supplied and said reverse acting thermostat being set for a temperature above which a cooling medium is to be supplied, said thermostats acting to so control delivery of air under pressure to said damper motor that a full volume of air is caused to be delivered from said heat exchange elements only at points above and below the setting of said thermostat.

IRVING H. DALE.